United States Patent [19]

Dirksing et al.

[11] Patent Number: 5,690,764
[45] Date of Patent: Nov. 25, 1997

[54] COLLAPSIBLE TUBE PACKAGE AND METHOD OF CONSTRUCTION

[75] Inventors: William P. Dirksing, Cleves; Dana P. Gruenbacher, Fairfield, both of Ohio

[73] Assignee: The Procter & Gamble Company, Cincinnati, Ohio

[21] Appl. No.: 611,295

[22] Filed: Mar. 5, 1996

Related U.S. Application Data

[62] Division of Ser. No. 387,652, Feb. 13, 1995, abandoned.

[51] Int. Cl.⁶ ................................................. B65B 7/00
[52] U.S. Cl. ...................... 156/69; 156/73.1; 156/309.6; 264/445
[58] Field of Search .................... 156/69, 73.1, 580.1, 156/580.2, 309.6; 264/442, 443, 445

[56] References Cited

U.S. PATENT DOCUMENTS

| | | | |
|---|---|---|---|
| 2,724,863 | 11/1955 | Gudge et al. | 222/107 |
| 3,465,917 | 9/1969 | Saeki | 222/107 |
| 3,700,513 | 10/1972 | Haberhauer et al. | 156/69 |
| 3,824,138 | 7/1974 | Karobath et al. | 156/69 |
| 4,132,331 | 1/1979 | Magerle | 222/107 |
| 4,448,829 | 5/1984 | Kohler | 222/107 |
| 4,509,660 | 4/1985 | Makilaakso | 222/107 |
| 4,526,297 | 7/1985 | Grimsley | 222/107 |
| 4,548,338 | 10/1985 | Sander | 222/107 |
| 4,568,001 | 2/1986 | Sander | 222/107 |
| 4,664,284 | 5/1987 | Magerle | 220/67 |
| 4,931,006 | 6/1990 | Schwyn et al. | 425/412 |
| 4,963,045 | 10/1990 | Willcox | 222/107 X |
| 5,036,889 | 8/1991 | Pherigo | 138/89 |
| 5,211,798 | 5/1993 | Keller | 156/500 |
| 5,244,520 | 9/1993 | Gordon et al. | 156/73.1 |
| 5,275,767 | 1/1994 | Micciche | 156/73.1 X |
| 5,372,863 | 12/1994 | Nishikawa | 222/107 X |
| 5,403,415 | 4/1995 | Schembri | 156/73.1 |
| 5,411,616 | 5/1995 | Desai et al. | 156/73.1 |
| 5,599,411 | 2/1997 | Schembri | 156/73.1 |

FOREIGN PATENT DOCUMENTS

| | | |
|---|---|---|
| 4096485 | 10/1985 | Australia . |
| 0051838 | 5/1982 | European Pat. Off. . |
| 84 839 | 3/1965 | France . |
| 2826116 | 1/1979 | Germany . |
| 53-141373 | 9/1978 | Japan . |
| 61-143119 | 6/1986 | Japan . |
| 6080150 | 3/1994 | Japan . |

*Primary Examiner*—James Sells
*Attorney, Agent, or Firm*—Ronald W. Kock

[57] ABSTRACT

A collapsible tube package having a reclosable closure comprises a tubular body having a first open end and a second open end. It also comprises a tube head having an outer shoulder surface and a perimeter edge. The tube head is located just inside the first open end of the tubular body such that a continuous wall portion of the tubular body extends longitudinally beyond the perimeter edge of the tube head. The continuous wall portion is swaged against and ultrasonically welded to the outer shoulder surface. The second open end of the tubular body is flattened and sealed closed. The tube head has an energy concentration ring melted into a sealing interface between the continuous wall portion and the outer shoulder surface, and the tubular body and the tube head comprise just two individual parts made of weldable, non-polar plastics having no metal laminates and metal particles therein.

1 Claim, 2 Drawing Sheets

COLLAPSIBLE TUBE PACKAGE AND METHOD OF CONSTRUCTION

This is a Divisional of application Ser. No. 08/387,652, filed on Feb. 13, 1995, abandoned.

FIELD OF THE INVENTION

The present invention relates to collapsible tube packages having reclosable closures at one end of the tube, and to methods of welding the tube package elements together.

BACKGROUND OF THE INVENTION

Collapsible tube packages are commonly used for viscous products like toothpastes and salves. A tubular body is typically formed and closed at one end by sealing a reclosable closure fitment to that end. Product is then added from the other end of the tube. The other end of the tube is closed by flattening it perpendicular to the longitudinal axis of the tubular body, and applying a crimp and/or planar heat seal.

Some tubular bodies are made as extruded or blown tubes and some are made by lap sealing together two edges of a rolled piece of thermoplastic film. Reclosable closure fitments, called tube heads, are generally intended for threaded closures. They are typically made by injection molding.

Tube heads are typically welded to one end of an open tube by induction or dielectric sealing methods, or by convection/conduction sealing methods. For example, a tube head and a tubular body may be brought together and welded by induction heating or by dielectric heating under the pressure of an ambient or cool temperature tool, which provides pressure to the interface between the pans. Induction heating relies on a metal layer in either the tube head, tubular body, or both, being heated by placing an oscillating magnetic induction field around the tube head. Dielectric heating relies on certain plastic materials, which have polar molecules, being heated by placing a radio frequency electromagnetic field around the tube head. Convection/conduction methods use hot air and/or a heated tool to drive heat through one part to the interface between them, which is then held under pressure to generate a weld. Methods using cool tools, such as induction and dielectric energy generally perform tube to tube head welding faster than hot tool methods.

Several prior an references disclose three-piece tube constructions containing a laminated tubular body, a laminated shoulder piece, and an injection molded fitment. The metal layer is believed to serve as a heating means for induction sealing. For example, U.S. Pat. No. 4,526,297 to Grimsley, issued Jul. 2, 1985, has a metal laminate three-piece tube consecution. Such construction requires the forming, handling and bonding of three components, which is believed less desirable than forming and handling just two components.

Welding a tube to a tube head having a conical shoulder usually requires either a cylindrical flange extending from the shoulder, which can be rolled against the tube, or swaging an end of the tube to match the conical angle of the tube head shoulder. In either method, one part is given a surface which overlaps that of the other part to create a sealing interface. The flange on the shoulder represents added material, which adds to tube package cost. It also stiffens the package near the discharge end, making it difficult to squeeze the last bit of product from the package. Flange welding typically involves rotation of the tube and progressive radial pressure application, whereas, the swaging alternative involves axially pressure applied over the entire seal area. Therefore, swaging the end of the tube is often preferable to providing a flange. Swaging is typically done before the parts are brought together for sealing.

What has been missing is a low cost tube package made of just two pieces, neither of which has an expensive metal layer or requires polar molecules; and a method of construction which has the tube swaged and welded in a single step with minimum cycle time.

SUMMARY OF THE INVENTION

Ultrasonic welding is an alternative sealing method to induction and dielectric welding, which also has a cool tool to provide rapid welding cycles. Ultrasonic welding does not rely on polar molecule materials or metal layered laminates to generate heat at a sealing interface. Instead, vibrational energy is converted to heat at the interface between parts. Thus, ultrasonics provides considerable latitude in thermoplastic material selection as well as high speed forming.

In one aspect of the present invention, a collapsible tube package having a reclosable closure comprises a tubular body having a first open end and a second open end. It also comprises a tube head having an outer shoulder surface and a perimeter edge. The tube head is located just inside the first open end of the tubular body such that a continuous wall portion of the tubular body extends longitudinally beyond the perimeter edge of the tube head. The continuous wall portion is swaged against and ultrasonically welded to the outer shoulder surface. The second open end of the tubular body is flattened and sealed closed.

Preferably, the tube head has an energy concentration ring melted into a sealing interface between the continuous wall portion and the outer shoulder surface, and the tubular body and the tube head comprise just two individual parts made of weldable, non-polar plastics having no metal laminates and metal particles therein. Preferably, the continuous wall portion of the tubular body extends about 2 mm to 4 mm beyond the perimeter edge of the tube head before it is swaged.

In another aspect of the present invention, a method of constructing a tube package having a reclosable closure comprises the steps of generating a tubular body having a first open end and a second open end; and a tube head having an inner shoulder surface, an outer shoulder surface, and a perimeter edge. Other steps involve locating the tube head on a mandrel, which has an anvil surface that fits against the inner shoulder surface; and positioning the mandrel and the tube head inside the first open end of the tubular body such that a continuous wall portion of the tubular body extends longitudinally beyond the perimeter edge of the tube head. Another step involves swaging the continuous wall portion against the outer shoulder surface of the tube head to form a swaged end of the tubular body, while the tube head is supported by the anvil surface of the mandrel. Still another step involves ultrasonically welding the swaged end of the tubular body to the outer shoulder surface of the tube head in order to close the first open end of the tubular body.

The method further comprises the steps of filling product into the second open end of the tube package, flattening the second open end, and sealing the second open end closed. The method may further comprise a step of melting an energy concentration ring into a sealing interface between the swaged end and the outer shoulder surface. The reclosable closure may be attached to the tube head prior to welding the tube head to the tubular body or after welding the tube head to the tubular body.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
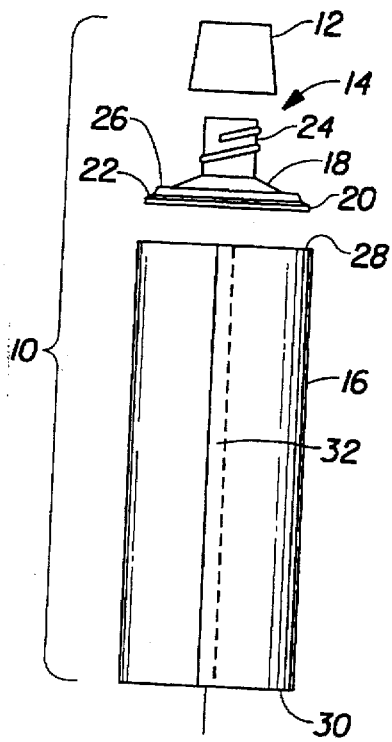
FIG. 1 is an exploded front elevation view of a preferred embodiment of the collapsible tube package of the present invention, disclosing a closure, a tube head, and a tubular body.

Referring now to the drawings, and more particularly to FIG. 1, there is shown a first preferred embodiment of the present invention, which provides a collapsible tube package, and is generally indicated as 10. Package 10, shown exploded, comprises a reclosable closure 12, a tube head generally indicated as 14, and a tubular body 16. Tube head 14 has a shoulder 18, which has a perimeter edge 20, an outer surface 22, an inner surface 23 (not shown in FIG. 1), and a threaded fitment 24. Fitment 24 has a hole 25 therethrough (not shown in FIG. 1) which provides fluid communication with tubular body 16 when package 10 is assembled. Tube head 14 also preferably has an energy concentration ring 26, used for ultrasonically welding tube head 14 to tubular body 16. Tube head 14 is preferably injection molded; however, thermoforming the tube head, including the fitment, could provide a way to incorporate a barrier layer into the tube head.

Tubular body 16 has a first open end 28 and a second open end 30. Tubular body 16 is shown having an overlapping seam 32, however, tubular body 16 could be a seamless tube, such as could be made by plastic extrusion or blowing processes.

Tube head 14 and tubular body 16 are each preferably made of plastic. They need not have expensive metal laminations or metal particles therein for induction sealing, nor do they need to be made of plastics having polar molecules necessary for dielectric sealing. Instead, the materials need only be compatible to thermal welding by means of ultrasonic vibration.

Figure 2:
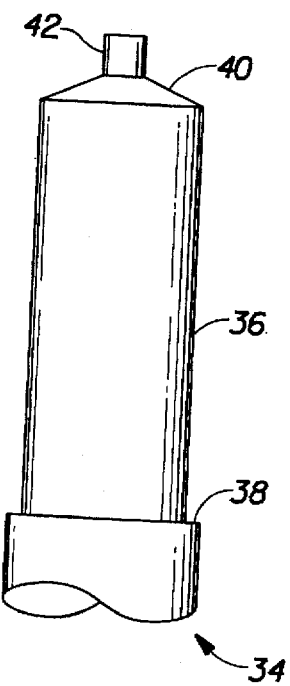
FIG. 2 is a front elevation view of a mandrel used in a preferred method of combining a tube head and a tubular body.

FIG. 2 shows a mandrel generally indicated as 34, which is used to position and weld tube head 14 to tubular body 16. Mandrel 34 has a body 36 which fits loosely into tubular body 16, preferably with a clearance of from 0.003 inches to 0.010 inches (0.076 mm to 0.254 mm). Mandrel 34 also has a step 38, a shoulder portion 40, and a centering pin 42. Step 38 positions second open end 30 when mandrel 34 is inserted into tubular body 16. Centering pin 42 locates fitment 24 on the mandrel, assuming that fitment 24 is centered on tube head 14. If fitment 24 is not centered on tube head 14, it may require orienting about pin 42 in order to be inserted into tubular body 16.

Shoulder portion 40 has substantially the same contour as inner shoulder surface 23 of tube head 14, so as to act as an anvil surface for welding tubular body 16 to outer shoulder surface 22. Shoulder portion 40 may have vacuum holes (not shown) which could act to hold a tube head onto mandrel 34. Also, a snap fit could be used to hold a tube head onto mandrel 34.

Figure 3:
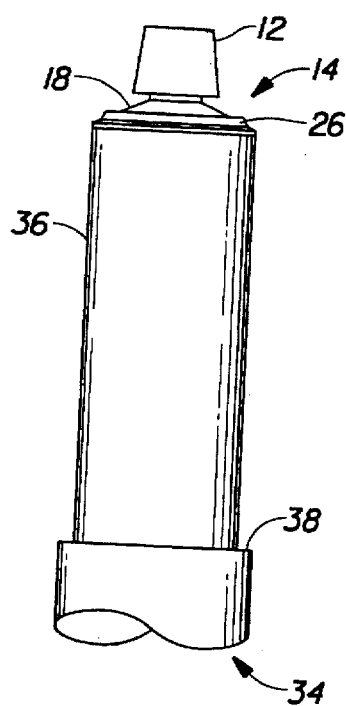
FIG. 3 is a front elevation view thereof, showing the closure and tube head of FIG. 1 assembled and mounted thereto.

FIG. 3 shows closure 12 preassembled to tube head 14 and both of them slipped over centering pin 42 of mandrel 34. In this condition, mandrel 34 is inserted into second open end 30 and through tubular body 16 to position tube head 14 at first open end 28. However, several other assembly sequences are possible. First, closure 12 need not be installed on tube head 14 until after the parts are welded together or just prior to filling tube package 10. Second, mandrel 34 could be inserted into tubular body 16, followed by placement of tube head 14 onto centering pin 42. Since tube head 14 preferably slip fits into tubular body 16, it may be dropped in at first open end 28 and onto mandrel 34. The preferred assembly sequence is that which is illustrated by FIGS. 3 and 4.

Figure 4:
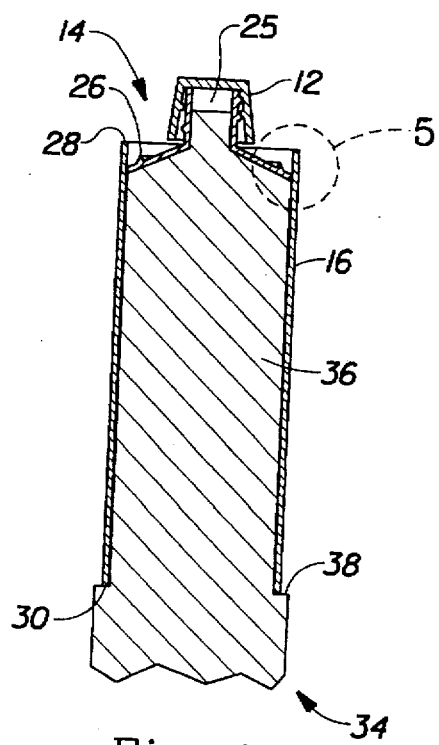
FIG. 4 is a sectioned front elevation view thereof, showing the position of the tube head inside a first open end of the tubular body prior to welding the two pieces together.
Figure 5:
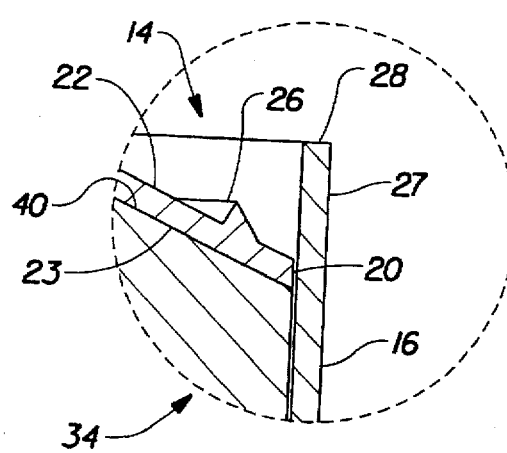
FIG. 5 is an enlarged view of a portion of FIG. 4 at dashed circle 5, showing an ultrasonic energy concentration ring projecting outward from the shoulder of the tube head.

FIG. 4 is a sectioned view which shows the location of tubular body 16 on mandrel 34, the location of tube head 14 on mandrel 34, and the relationship between tube head 14 and tubular body 16 prior to swaging at first open end 28. A continuous wall portion 27 of tubular body 16 preferably extends about 2 mm to 4 mm longitudinally beyond perimeter edge 20 of tube head 14 to form an extended wall portion. Dashed circle 5 indicates the location of the enlarged view of FIG. 5. FIG. 5 shows more clearly energy concentration ring 26 on outer shoulder surface 22 of tube head 14. Preferably, energy concentration ring 26 is concentric with tube head 14 and it extends substantially longitudinally from outer shoulder surface 22 of tube head 14. Although ultrasonic welding does not require ring 26, ring 26 serves to improve ultrasonic sealing and to reduce the accuracy with which an ultrasonic horn must be aligned with mandrel 34 to effect a good seal all the way around tube head 14. For example, if mandrel 34 is one of four mandrels mounted radially as equally spaced spokes on an indexing wheel, and an ultrasonic horn is mounted external to the wheel, some difference in alignment with the horn might be expected from mandrel to mandrel or from index to index.

Figure 6:
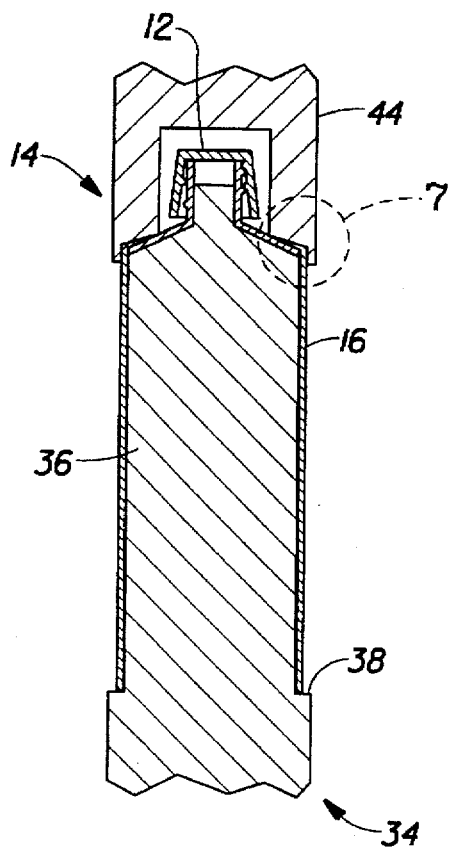
FIG. 6 is a sectioned front elevation view similar to FIG. 4, showing an ultrasonic horn swaging the first open end of the tubular body against the outer shoulder surface of the tube head, while the tube head is supported by the mandrel, and welding the swaged first open end to the shoulder of the tube head.

FIG. 6 shows an ultrasonic horn 44 lowered onto tube head 14, which is supported by mandrel 34. Horn 44 is preferably hollow to surround closure 12 and fitment 24 of tube head 14 without contacting them. An ultrasonic horn enables heating to occur at a sealing interface in tenths of a second, without having to conduct heat through one part or the other. Also, by being a cool tool as opposed to a heated tool, an ultrasonic horn, typically made of aluminum, draws heat from the softened seal interface enabling the weld to set up quickly. Thus, minimum cycle time is provided by use of ultrasonic horn 44.

Horn 44 has an internal step 46 which inwardly swages continuous wall portion 27 against outer surface 22 to form swaged end 48 on tubular body 16. The swaging step occurs in one operation by a common tool in direct contact with the extended wall portion as horn 44 is lowered onto continuous wall portion 27. Step 38 of mandrel 34 supports second open end 30 of tubular body 16 as swaging occurs. Wrinkling occurs in swaged end 48 during this process. However, as internal step 46 of tool 44 presses swaged end 48 against outer shoulder surface 22 of tube head 14, the wrinkles are flattened and swaged end 48 is welded to surface 22 forming an outermost layer on outer shoulder surface 22. This is best seen in FIG. 7, which is an enlarged view of a portion of FIG. 6 at dashed circle 6.

Figure 7:
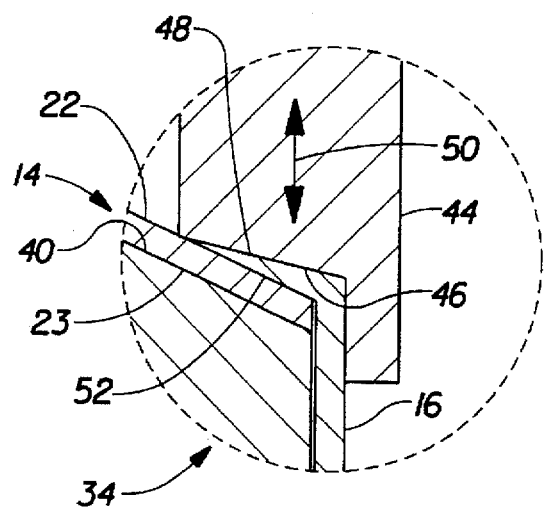
FIG. 7 is an enlarged view of a portion of FIG. 6 at dashed circle 7, showing the welded interface between the tubular body and the tube head.

FIG. 7 also shows inner shoulder surface 23 of tube head 14, which is supported by shoulder 40 of mandrel 34. Arrows 50 show the direction of vibration of horn 44. Energy concentration ring 26 is melted and flows into a sealing interface 52, which is created between swaged end 48 and outer shoulder surface 22. When welding is completed, a feathered transition is preferably formed at the end of swaged end 48.

Figure 8:
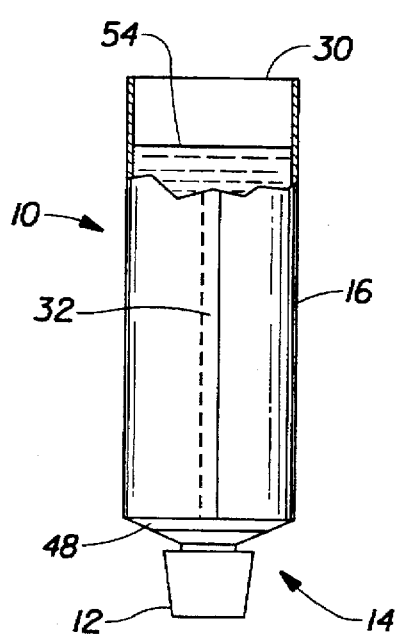
FIG. 8 is a partially sectioned front elevation view of the assembled collapsible tube package of FIG. 1, showing the tube inverted and filled.

FIG. 8 shows tube head 14 welded to tubular body 16 and closure 12 installed onto tube head 14. As indicated hereinbefore, closure 12 may be installed either before or after tube head 14 and tubular body 16 are welded together. FIG. 8 is partially sectioned to show product 54 filled into inverted tube package 10 from second open end 30. Sufficient headspace is provided above product 54 to enable flattening and closing second open end 30.

Figure 9:
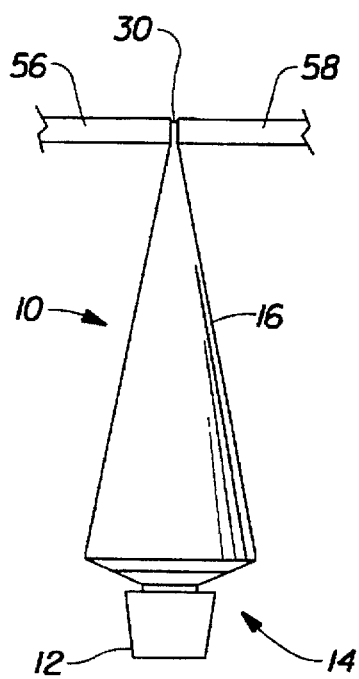
FIG. 9 is a side elevation view thereof, showing the second open end of the tubular body flattened and sealed closed by sealing jaws.

FIG. 9 shows second open end 30 flattened substantially perpendicular to a longitudinal axis of tubular body 16. Second open end 30 is preferably flattened and sealed closed by a pair of opposing sealing dies 56 and 58. The sealing of second open end 30 could occur prior to filling and filling could be achieved through hole 52 in tube head 14, however, the small size of hole 52 relative to second open 30 may cause the filling time to be excessive. Thus, filling through second open end 30 is preferable. Also, second open end 30 could be sealed in a plane which is not centered on or perpendicular to the longitudinal axis of tubular body 16. Such an alternative would not be symmetrical, however. Furthermore, tubular body 16 and mandrel 34 are not necessarily cylindrical, but cylindrical is preferred to avoid tube head orientation concerns.

In a particularly preferred embodiment of the present invention, tube head 14 is molded of low density polyethylene, and conical shoulder 18 is 0.020 inches (0.51 mm) thick where welded. Ring 26 rises about 0.017 inches (0.43 mm) from outer shoulder surface 22 to a point, having an included angle of 90°. Shoulder 18 is angled about 45° to the tube head axis of rotation. The diameter of tube head 14 at perimeter edge 20 is approximately 1.07 inches (27.18 mm).

Tubular body 16 is made of a laminate of low density polyethylene, ethylene vinyl alcohol copolymer, and linear low density polyethylene. The laminate has specification number GS6268, and is made by American National Can of Washington, N.J. Body 16 has a wall thickness of 0.011 inches (0.28 mm). The internal diameter of tubular body 16, where film is overlapped and seamed, is approximately 1.08 inches (27.43 mm).

Mandrel 34 is made of solid steel and has the same body diameter as tube head 14. The shoulder or anvil surface 40 of mandrel 34 is angled at 45° to the axis of rotation of the mandrel.

Ultrasonic sealing is accomplished by a Branson model 401, 20 KHZ Ultrasonic Sealer, made by Branson Ultrasonics of Danbury, Conn. A pressure of about 4000 psi (275.8 bar) is developed at the weld area for a period of about 0.8 seconds of vibration and 0.5 seconds hold time. The amplitude of vibration is estimated to be 0.002 inches (0.051 mm). Horn 44 is made of 2024 T351 aluminum, and internal step 46 is angled at about 45° to the axis of rotation of the horn.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method of constructing a tube package comprising the steps of:

a) generating a tubular body, said tubular body having a first open end and a second open end;

b) generating a tube head having an inner shoulder surface, an outer shoulder surface, and a perimeter edge;

c) locating said tube head on a mandrel having an anvil surface which fits against said inner shoulder surface;

d) positioning said mandrel and said tube head inside said first open end of said tubular body such that a continuous wall portion of said tubular body extends longitudinally beyond said perimeter edge of said tube head to form an extended wall portion;

e) swaging said extended wall portion inwardly against said outer shoulder surface of said tube head to form a swaged end of said tubular body, said tube head being supported by said anvil surface of said mandrel; and f) ultrasonically welding said swaged end of said tubular body to said outer shoulder surface of said tube head in order to close said first open end of said tubular body, and melting an energy concentration ring, which extends longitudinally from said outer shoulder surface of said tube head, into a sealing interface between said swaged end and said outer shoulder surface; said swaging and said ultrasonic welding steps occuring in one operation by a common tool in direct contact with said extended wall portion.

* * * * *